Feb. 29, 1944.   E. KOTCHER   2,342,674
AIR SPEED COMPUTER
Filed Feb. 25, 1941
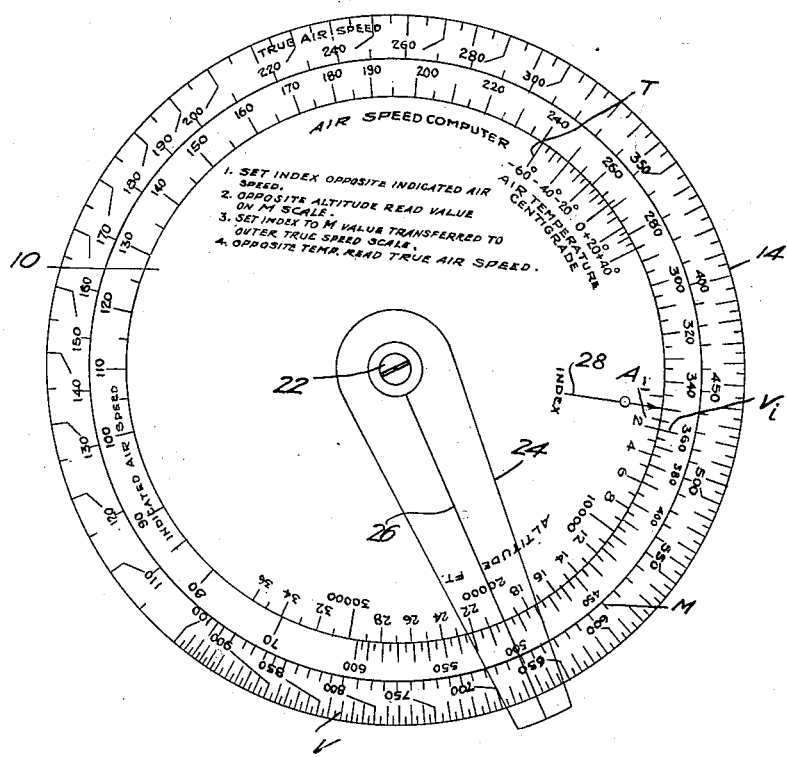
INVENTOR
EZRA KOTCHER
BY
ATTORNEYS Patented Feb. 29, 1944

2,342,674

UNITED STATES PATENT OFFICE 2,342,674

AIR-SPEED COMPUTER

Ezra Kotcher, Dayton, Ohio

Application February 25, 1941, Serial No. 380,485

1 Claim. (Cl. 235—84)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to computers and more particularly to a computer for use in quickly and accurately determining the true air speed of a moving body—such as an airplane—from data indicated on instruments carried by the airplane. In view of the increasing importance of accurate flight research, aerial navigation and bombing, it is in some instances imperative that the true air speed of aircraft be known to a high degree of accuracy.

Because of many existent sources of error, a great deal of difficulty has been experienced in accurately determining the true air speed of an airplane and especially at speeds in excess of 250 miles per hour. Certain of these errors, such as mechanical and installation errors may be evaluated to a large extent by timed flight over a measured speed course. Errors due to inherent characteristics of the instruments resulting from the difference between the characteristics of the standard sea level air assumed for marking the dial and the air that is actually encountered in flight, may be corrected by theoretical methods of computation which are the subject matter of the present invention.

In the present form of air-speed indicators, the indicator needle operates as the result of a difference in pressure between the Pitot tube and the static tube, this difference in pressure being equal to the impact pressure. Until recently the compressibility of air was ignored in the calibration of air-speed indicators as it also was in air-speed computers used in converting to true air speed the air speed indicated at conditions other than standard sea level atmospheric conditions. However, it has been found that with the advent of modern high speed airplanes it is necessary—in order to accurately calculate true air speed—to take into consideration the adiabatic compressibility of air coming to rest. In that case the impact pressure $\Delta P$ for operating the air-speed indicator may be given by the formula $$\Delta P = P\left[\left(1+\frac{k-1}{2}M^2\right)^{\frac{k}{k-1}}-1\right]$$

where
$P$=Free air static pressure in pounds per square foot
$k$=Adiabatic exponent=1.40 for air
$V$=True air speed
$c$=Velocity of sound=$45\sqrt{T}$ M. P. H.
   $T$ being absolute temperature in centigrade degrees=C°+273

$$M=\frac{V}{c}=\text{Mach's Number}$$

Mach's Number is well known in the sciences dealing with the compressibility of air such as in the study of shock waves caused by bullets travelling at supersonic speeds and the study of airfoil characteristics at very high speeds approaching the velocity of sound.

Instruments for indicating air speed are now calibrated under standard conditions in accordance with the same theory used to develop the above stated formula and it is the purpose of the present invention to provide a computer for converting indicated air speed observed under atmospheric conditions other than standard to true air speed. By way of explanation, standard pressure altitude represents a fictitious altitude for a given actual pressure observed at an actual altitude according to accepted relationships between pressure and altitude. The standard atmosphere has been established in order to reduce airplane performance under different atmospheric conditions to a common basis of comparison with respect to a standard average variation of atmospheric conditions of pressure, density, and temperature with altitude.

The theory in back of the construction of the computer is as follows:

Since true velocity is a function of impact pressure a given impact pressure and its corresponding indicated air speed for sea level standard atmospheric conditions represents different true velocities for different atmospheric conditions. True velocity at conditions other than the standard conditions under which the air-speed indicators are calibrated may therefore be computed by equating impact pressures at sea level to altitude condition as follows:

$$P_0\left[\left\{1+\frac{k-1}{2}\left(\frac{V_i}{C_0}\right)^2\right\}^{\frac{k}{k-1}}-1\right]= P\left[\left\{1+\frac{k-1}{2}\left(\frac{V_t}{C}\right)^2\right\}^{\frac{k}{k-1}}-1\right]$$

where
$P_0$=the standard sea level atmospheric pressure =2116.4 lbs. per sq. ft.
$P$=the actual atmospheric pressure at the altitude where the speed is being measured
$c_0$=the velocity of sound in the standard sea level atmosphere=763 M. P. H.
$c$=the velocity of sound in M. P. H. at the altitude where the flight is being measured, and is equal to $$\frac{\sqrt{T+273}}{.0222}$$

degrees where T is in centigrade degrees
$k$=the adiabatic exponent=1.40 for air
$V_i$=the indicated air speed in M. P. H.
$V_t$=the true air speed in M. P. H. which is to be determined In the above equation the quantity $$\frac{V_i}{c_o} = \frac{V_i}{763}$$

which is also equal to the indicated Mach's Number $M_i$ and $$\frac{V_t}{c} = \frac{.0222 V_t}{\sqrt{T+273}}$$

which is equal to the true Mach's Number $M_t$. The above equal values may be substituted in the above equation along with known standard sea level quantities and the equation becomes $$\frac{2116.4}{P}[(1+.20M_i^2)^{3.5} - 1] = [(1+.20M_t^2)^{3.5} - 1]$$

In using the computer constructed in accordance with the teaching of the invention, the above equation may be solved directly for $M_t$ knowing the standard pressure altitude P as given by an altimeter and the indicated air speed $V_i$ as given by an air-speed indicated. The value $V_t$ may be obtained from a product of the calculated $M_t$ and a factor for temperature observed at the given altitude.

It will be noted that the above equation comprises three factors, i. e., $$\frac{2116.4}{P}$$

the factor within the left hand bracket; and the factor within the right hand bracket. The first factor may be evaluated for any standard pressure altitude by a simple division; the second factor may be evaluated for any known indicated air speed; and the product of the first and second factors will result in an evaluation of the third factor within the right hand bracket. In view of the fact that the equations within the left and right hand brackets are identified in form, it is possible to formulate a computer by which an unknown variable such as $M_t$ within one of the brackets may be solved for directly in terms of the other variable quantities in the equation. This result is accomplished by the hereinafter described physical embodiment of the computer in which, The single figure in the drawing is a plan view of the computer constructed in accordance with the invention.

Referring to the drawing, the computer is composed of two relatively movable disk-like members 10 and 14 and an indexing arm 24. Members 10, 14 and 24 are rotatably mounted for relative movement on a pin-like member 22. Member 10 has located thereon an altitude scale A and a temperature scale T. Member 14 is provided with an indicated air speed scale $V_i$, a Mach's Number scale M and a true air speed scale $V_t$. Indexing arm 24 is composed of suitable transparent material and is provided with an indexing line 26 suitably formed thereon. The A and T scales are provided with a common indexing line 28.

The construction, coordination, correlation and cooperation of the scales will now be described.

The A scale constituting the first factor or $$\frac{2116.4}{P}$$

is constructed by dividing 2116.4 by the pressure P corresponding to the standard altitude as indicated by an altimeter, locating this latter value on the line markings of a standard logarithmic scale and identifying it by the altitude corresponding to the given pressure altitude. For example, for an altimeter reading of 10,000 ft. the corresponding standard pressure is 1455.7 lbs. per square foot, and dividing this into 2116.4 the result 1.453 is obtained. On the standard logarithmic scale 1.453 is located but identified as 10,000 ft. altitude. The position of the index arrow on the scale corresponds to the standard sea level zero altitude or 1.00 on the standard logarithmic scale. The range of the altitude scale as shown in the drawing is, in the preferred embodiment of the invention, from −1000 ft. to + 36,000 ft.

The indicated air speed scale $V_i$ representing the second factor or the numerical value within the left hand bracket is computed for a given indicated air speed $V_i$—and therefore a corresponding $M_i$—positioned on standard logarithmic scale markings and identified by the corresponding indicated air speed $V_i$. For example, for an indicated air speed $V_i$ of 300 M. P. H., the expression in the bracket is equal to 0.1130. The value 0.1130 is positioned on logarithmic scale markings and identified as 300 M. P. H. In view of the fact that a multiplication operation is performed by the scales $V_i$ and A, the unit length or scale modulus of the $V_i$ logarithmic scale is necessarily the same as that for the A scale. Since a continuously linear $V_i$ scale is desirable, it will be necessary to use more than one unit length of a logarithmic scale. For example, if the desired range for the $V_i$ scale is from 70 M. P. H., to 600 M. P. H., then the first portion of the $V_i$ scale from 70 M. P. H. to 91.6 M. P. H. will be derived by means of a logarithmic scale varying from 0.00662 to 0.010. The next portion of the $V_i$ scale from 91.6 M. P. H. to 282.5 M. P. H. will be derived by means of a complete unit length of similar logarithmic scale varying from 0.010 to 0.100. The final portion of the $V_i$ scale 282.5 M. P. H. to 600 M. P. H. will be derived by means of a similar logarithmic scale varying from 0.100 to 0.502.

The M scale is constructed as follows: The bracketed expression on both sides of the equation are of the same mathematical form. For a given value of $M_i$ or $M_t$ there is a corresponding and identical numerical value for the expression in either bracket. As mentioned above the value of the expression in the bracket is actually the one that corresponds to the value on the logarithmic scale from which the $V_i$ scale was derived. For that reason it is possible to arrange an M scale which is fixed relative to the $V_i$ scale. For example, an indicated Mach's Number $M_i$ which is equal to 0.3 is set down. However, for convenience in operation of the slide rule for reasons which will appear later, the values shown on the M scale in the drawing are 1000 times greater than the Mach's Number, so that the 0.3 number is actually set down as 300 on the M scale. This is done because as shown in the figure of drawing one set of numbers is used for both the M scale and the true speed scale. In order to avoid difficulties with the decimal point the M value, which is always less than one, is multiplied by 1000 to give a range of numerical values comparable to the range of speeds expected for airplanes. In view of the identity of the form of the equations within the left and right hand brackets and the fact that the numerical values within the left hand bracket are designated in terms of a $V_i$ value and also the fact that coordinated with the $V_i$ value is a corresponding scale of M values, it follows that $M_t$ may be determined directly by a multiplication operation between the A and $V_i$ scales.

The equation may now be solved directly for $M_t$ as in the following example for an indicated air speed $V_i$ of 350 M. P. H. (corresponding to $M_i=0.460$) and a pressure altitude of 20,000 ft. In order to determine the true Mach's Number $M_t$, set the index arrow of the A scale opposite 350 on the $V_i$ scale, then set an indicator over 20,000 on the A scale and read under the indicator line on the M scale the value 661, i. e., $M_t=0.661$.

Knowing $M_t$ it is now desired to calculate $V_t$. Since $V_t$ is equal to $$V_t = \frac{M\sqrt{T+273}}{.0222}$$

it is now necessary to construct on the computer, the $V_t$ and T scales for solving the above equation.

The $V_t$ scale is a standard logarithmic scale and is constructed as follows: In the process of determining the true air speed $V_t$, it is necessary to transfer to the $V_t$ scale the $M_t$ value as found on the M scale. Therefore, in order to facilitate this transfer the logarithmic $V_t$ scale is marked with figures similar to those chosen for the M scale. In addition, the $V_t$ scale may be oriented with respect to the M scale so as to permit the use of one set of figures for both scales. As shown in the drawing, this can be accomplished satisfactorily if 450 on the $V_t$ scale is set opposite 450 on the M scale for 340 on the $V_i$ scale. With a proper choice of range and modulus, the M and $V_t$ scales may be combined into a single scale by having the values represented on the M and $V_t$ scales made to coincide or to be so nearly in coincidence as to make the error negligible.

The temperature scale T is made as follows: An index arrow is chosen so as to correspond to the position of .0222 on a standard logarithmic scale which must be of the same modulus or unit length as was employed for the $V_t$ scale since essentially a multiplication process must be performed. Then for different values of T in centigrade degrees, the value of $\sqrt{T+273}$ is determined and also located on this logarithmic scale, but identified by the corresponding temperature T. For example, for the temperature of $-20°$ C., the value of $\sqrt{-20+273}$ is equal to 15.9. Within the same unit length of logarithmic scale which was used to locate the temperature index arrow, the value of 15.9 is located but identified as $-20°$ C.

For simplicity of construction, the T scale is placed on the same moving element as the A scale, and the same index arrow is used for both the temperature and altitude scales.

True air speed may be obtained by means of the $V_t$ and T scales as follows: For instance, assume the previous example of an indicated air speed of 350 M. P. H. observed at 20,000 ft. where, in addition, the observed air temperature was found to be $-30°$ C. The value on the M scale corresponding to the true Mach's Number $M_t$ was found to be 661. This value is transferred to the $V_t$ scale by setting the line of the indicator over 661 on the $V_t$ scale. Then the temperature scale is moved until the temperature index arrow is also under the indicator line. The indicator line is then moved to coincide with the temperature of $-30°$ on the T scale and the true air speed, $V_t$ is found under the indicator line on the $V_t$ scale to read 463 M. P. H.

Although a single preferred embodiment of the invention has been described, it is to be understood that changes and modifications may be made in the device without departing from the spirit and substance of invention. Various modifications and changes may be made by those skilled in the art without departing from the inventive concept, and it is intended that the invention be limited only by the scope of the appended claim.

I claim:

A true air speed computing slide rule comprising two relatively movable members, one of said members having a first logarithmic scale expressing a ratio of standard sea level atmospheric pressure to the indicated pressure at varying altitudes, and having indicia identified in terms of said altitudes, a second logarithmic scale cooperating with the first scale and positioned on the other of said movable members, said second scale expressing the value of the multiplying factor which corrects the standard static sea level pressure to give the value of the air corrected for compressibility when the air is brought to rest, the indicia on said second scale being identified in terms of the indicated air speed, a third scale immovably positioned with respect to said second scale, said third scale expressing the ratio of the true air speed to the velocity of sound at the corresponding altitude, a fourth logarithmic scale positioned on said other member carrying logarithmically arranged indicia, said indicia representing both the transferred values of the third scale and the true air speed, and a fifth logarithmic scale positioned on said one movable member and cooperating with said fourth scale, said fifth scale expressing the velocity of sound identified thereon in terms of the air temperature, which scale, in cooperation with the transferred value of the third scale to the fourth scale, gives the true air speed on the fourth scale.

EZRA KOTCHER.